United States Patent
Ryu

(10) Patent No.: US 8,090,242 B2
(45) Date of Patent: Jan. 3, 2012

(54) METHOD FOR SELECTIVELY REPRODUCING TITLE

(75) Inventor: Han Seop Ryu, Suwon-si (KR)

(73) Assignee: LG Electronics Inc., Seoul (KR)

( * ) Notice: Subject to any disclaimer, the term of this patent is extended or adjusted under 35 U.S.C. 154(b) by 1559 days.

(21) Appl. No.: 11/482,829

(22) Filed: Jul. 10, 2006

(65) Prior Publication Data

US 2007/0019929 A1    Jan. 25, 2007

(30) Foreign Application Priority Data

Jul. 8, 2005   (KR) ........................ 10-2005-0061713

(51) Int. Cl.
| | |
|---|---|
| H04N 5/78 | (2006.01) |
| H04N 5/765 | (2006.01) |
| H04N 5/783 | (2006.01) |
| G04B 13/00 | (2006.01) |
| G10H 1/36 | (2006.01) |
| G11B 5/596 | (2006.01) |
| G11B 7/085 | (2006.01) |
| G11B 19/00 | (2006.01) |

(52) U.S. Cl. .......... 386/324; 386/232; 386/345; 84/609; 84/634; 360/78.07; 369/30.04; 369/30.27; 369/47.54

(58) Field of Classification Search ................ 386/95, 386/111, 131, E5.017, E9.013; 84/609, 634; 360/78.07, 178.01; 369/30.04, 30.27, 47.54; 375/E7.189, E7.191, E7.267; 707/999.007, E17.108

See application file for complete search history.

(56) References Cited

U.S. PATENT DOCUMENTS

| | | | | |
|---|---|---|---|---|
| 4,926,404 | A | * | 5/1990 | Kimura et al. ............. 369/30.27 |
| 5,745,645 | A | * | 4/1998 | Nakamura et al. ............ 386/233 |
| 5,895,876 | A | * | 4/1999 | Moriyama et al. .............. 84/609 |
| 2004/0264320 | A1 | | 12/2004 | Takahashi |
| 2006/0218146 | A1 | * | 9/2006 | Bitan et al. ........................ 707/7 |

FOREIGN PATENT DOCUMENTS

| | | | |
|---|---|---|---|
| CN | 1545806 A | | 11/2004 |
| KR | 10-2004-0017681 A1 | | 2/2004 |
| KR | 2005038329 A | * | 4/2005 |
| KR | 10-1999-0083338 B1 | | 3/2006 |

* cited by examiner

Primary Examiner — Thai Tran
Assistant Examiner — Syed Hasan
(74) Attorney, Agent, or Firm — Birch, Stewart, Kolasch & Birch, LLP

(57) ABSTRACT

A method and apparatus for reproducing titles are discussed. According to an embodiment, the method includes determining if at least one title satisfies a criterion, using an average length information of a plurality of titles recorded on a recording medium; and reproducing the at least one title if the determining step determines that the at least one title satisfies the criterion.

36 Claims, 3 Drawing Sheets

METHOD FOR SELECTIVELY REPRODUCING TITLE

This application claims the benefit of the Korean Patent Application No. 10-2005-0061713 filed on Jul. 8, 2005 in Republic of Korea, the entire contents of which are hereby fully incorporated by reference.

BACKGROUND OF THE INVENTION

1. Field of the Invention

The present invention relates to a method for selectively reproducing titles, and more particularly to a method and apparatus for selectively reproducing titles satisfying a predetermined condition from a recording medium having a plurality of titles.

2. Description of the Related Art

As generally known in the art, optical discs such as digital versatile discs (DVD), which are capable of storing high definition video data and high quality audio data with a high capacity, and optical disc devices capable of recording data on the optical discs and reproducing the data are widely used.

If an optical disc is inserted into an optical disc device such as a DVD-player, the optical disc device reads out navigation information recorded in a specific area such as a lead-in area of the inserted optical disc so as to download the navigation information and store it in a memory embedded in the optical disc device. Then, the optical disc device performs a reproduction operation requested by a user based on the downloaded navigation information.

For example, if a user selects a title (unit of area) on an optical disc, the optical disc device searches for a corresponding title recorded in a data area of the optical disc based on the navigation information, reads out video data and audio data for the corresponding title, and then reproduces the read-out data as high definition video and high quality audio.

Recently, a method is suggested for selectively reproducing a main title stored on an optical disc. For example, if a user requests an operation for selectively reproducing a main title, the optical disc device selects a main title having the greatest amount of data or the longest data reproduction length, among a plurality of titles recorded in a data area of the optical disc, based on the navigation information, and reproduces the selected main title. This is advantageous because the optical disc device can automatically bypass reproduction of warnings and advertisements recorded on the optical disc.

However, according to this method, if the user requests the operation for selectively reproducing a main title in a state where an optical disc such as a karaoke disc, on which plural pieces of audio music are recorded as individual titles, is inserted into the optical disc device, the optical disc device automatically reproduces only one piece of audio music having the longest data length among the plural pieces of audio music recorded on the karaoke disk. In this case, the user is not able to access other songs at that time because the optical disc device is programmed to automatically reproduce only one piece of audio music with the longest data length. Accordingly, to select the remaining/other pieces of audio music, a manual manipulation of menus may be needed, which can be inconvenient to the user.

SUMMARY OF THE INVENTION

Accordingly, the present invention has been made to address the above-mentioned and other problems associated with the related art.

An object of the present invention is to provide a method and apparatus for reproducing titles from a recording medium such as an optical disc, wherein the titles carry audio data only (e.g., music), video data without any audio data, or video data including audio data (e.g., movies), or a combination thereof.

According to an aspect of the present invention, there is provided a method for reproducing data, the method including determining if at least one title satisfies a criterion, using an average length information of a plurality of titles recorded on a recoding medium; and reproducing the at least one title if the determining step determines that the at least one title satisfies the criterion.

According to another aspect of the present invention, there is provided a method for reproducing data, the method including determining if at least one title recorded on a recording medium satisfies a criterion, using a reference value selected by a user; and reproducing the at least one title if the determining step determines that the at least one title satisfies the criterion.

According to another aspect of the present invention, there is provided a method for reproducing data, the method including determining if at least one title recorded on a recording medium satisfies a criterion, using a reference value selected by a user; and reproducing the at least one title if the determining step determines that the at least one title satisfies the criterion.

According to another aspect of the present invention, there is provided an apparatus for reproducing data, the apparatus including a controller to determine if at least one title recorded on a recording medium satisfies a criterion, using a reference value selected by a user; and a reproducing unit to reproduce the at least one title if the controller determines that the at least one title satisfies the criterion.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF PREFFERRED EMBODIMENTS

Figure 1:
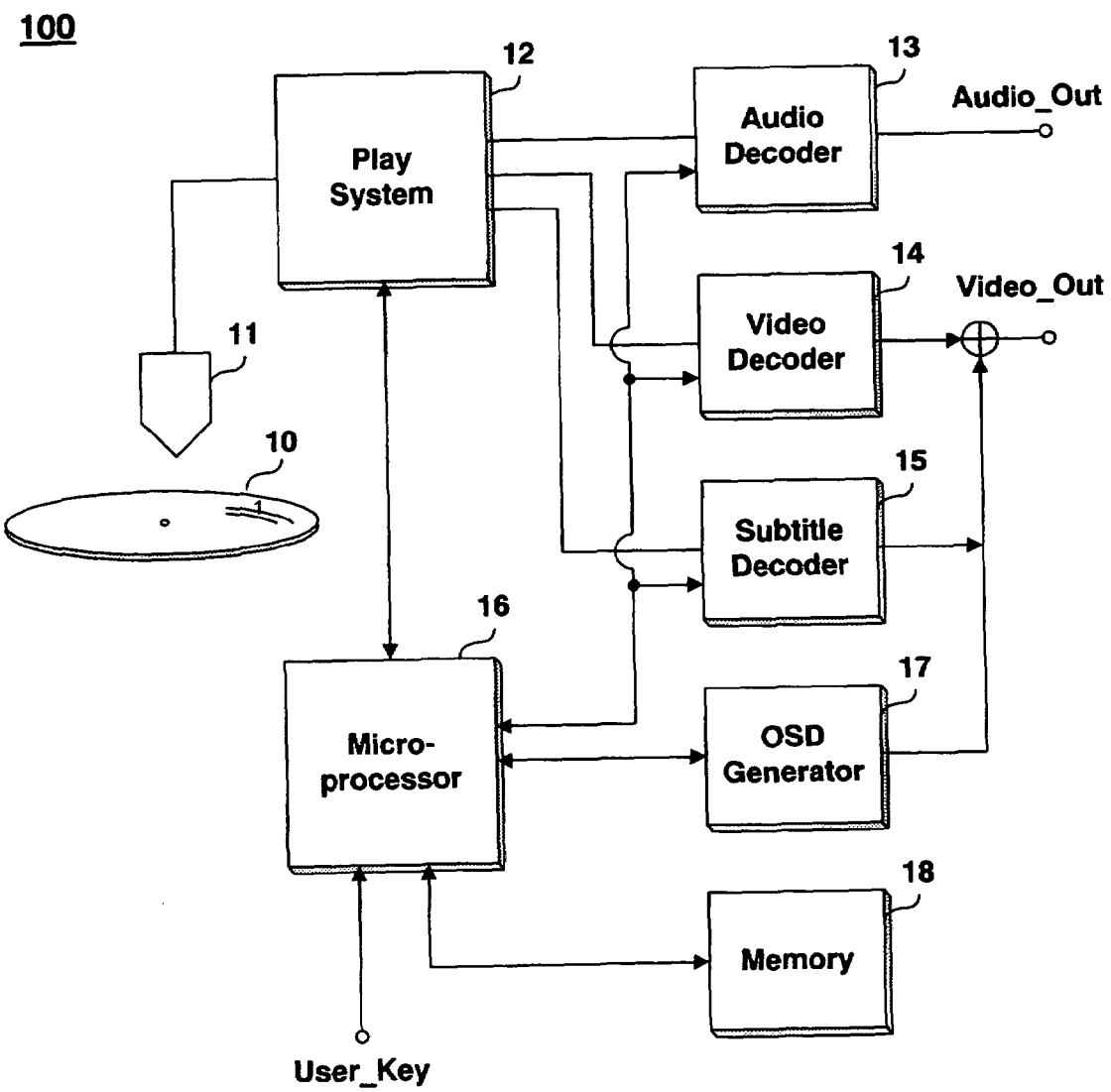
FIG. 1 is a block diagram illustrating the structure of an optical disc device according to an embodiment of the present invention.

Hereinafter, preferred embodiments of the present invention will be described with reference to the accompanying drawings. In the following description and drawings, the same reference numerals are used to designate the same or similar components, and so repetition of the description on the same or similar components will be omitted.

FIG. 1 is a block diagram illustrating the structure of an optical disc device 100 according to the present invention. The optical disc device 100 includes an optical pick up 11 for accessing a recording medium such as an optical disc 10, e.g., a CD, a DVD, etc., a play system 12, an audio decoder 13, a video decoder 14, a subtitle decoder 15, a microprocessor 16, an on screen display (OSD) generator 17, and a memory 18. All the components of the optical disc device 100 are operatively coupled. The optical disc device 100 can be one of various types of optical disc devices such as a DVD-player, a karaoke machine, etc.

When the optical disc 10 such as a karaoke disc is inserted into the optical disc device 100, the microprocessor 16 controls the operation of the play system 12 to read out navigation information recorded in a specific area such as a lead-in area of the optical disc 10 so as to download the navigation information into the memory 18.

Figure 2:
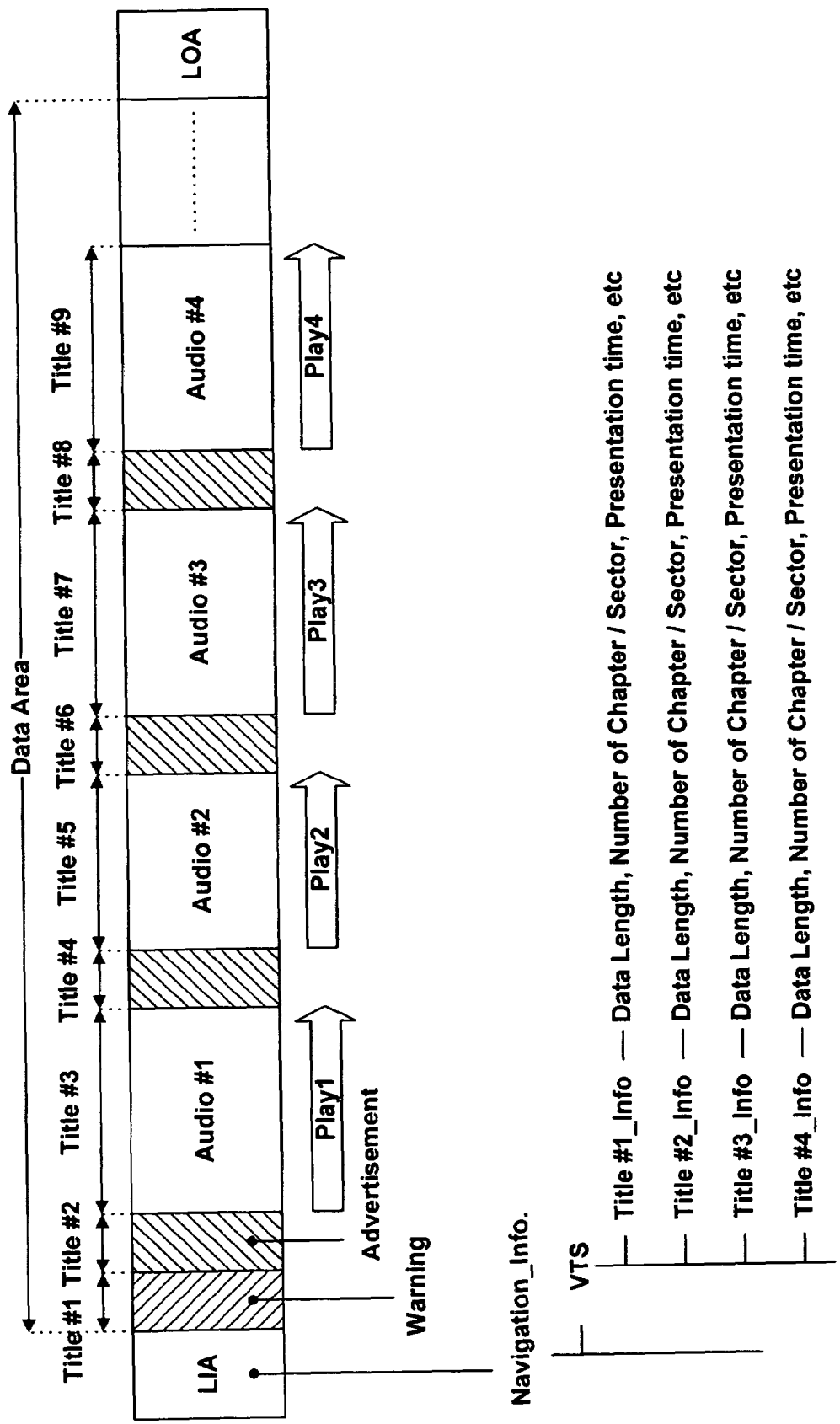
FIG. 2 is a view illustrating an example for illustrating an operation of selectively reproducing titles according to an embodiment of the present invention.

The microprocessor 16 reproduces titles recorded on the optical disc 10 based on the navigation information. For example, as shown in FIG. 2, when the microprocessor 16 performs an operation for selectively reproducing titles according to the present invention through the request of a user, the microprocessor 16 confirms a data length (Data Length) for a title or a reproduction time (presentation time) of a title based on each piece of title information (Title #N_Info) included in the navigation information (Navigation_Info) stored in the lead-in area of the optical disc 10. A reproduction time can be the playing time (duration) of a title.

Then, if the data length is used, the microprocessor 16 calculates an average data length by, e.g., adding the data lengths of all (or some) titles recorded on the optical disc 10 and dividing the sum appropriately, uses the calculated average data length as a reference value, and then selects titles (e.g., Title #3, #5, #7, #9 . . . ) having the data length above this reference value for reproduction. If the reproduction time is used, the microprocessor 16 calculates an average reproduction time by, e.g., adding the reproduction times (e.g., presentation times) of all (or some) titles recorded on the optical disc 10 and dividing the sum appropriately, uses the calculated average reproduction time as a reference value, and then selects titles (e.g., Title #3, #5, #7, #9 . . . ) having the reproduction time above this reference value for reproduction.

If a user inputs a data length (or a reproduction time) to be used as a reference value for the title selection, the microprocessor 16 selects titles having data length (or reproduction time) above the input reference value, and then controls the operation of the play system 12 so as to reproduce the selected title(s) in a title recording sequence. Or, the selected titles can be reproduced in a sequence specified by a user. The titles stored on the optical disc 10 can carry audio data only (e.g., music), video data without any audio data, or video data including audio data (e.g., movies), or a combination thereof. Hereinafter. Now, the description of the above-discussed operation is given below in detail.

Figure 3:
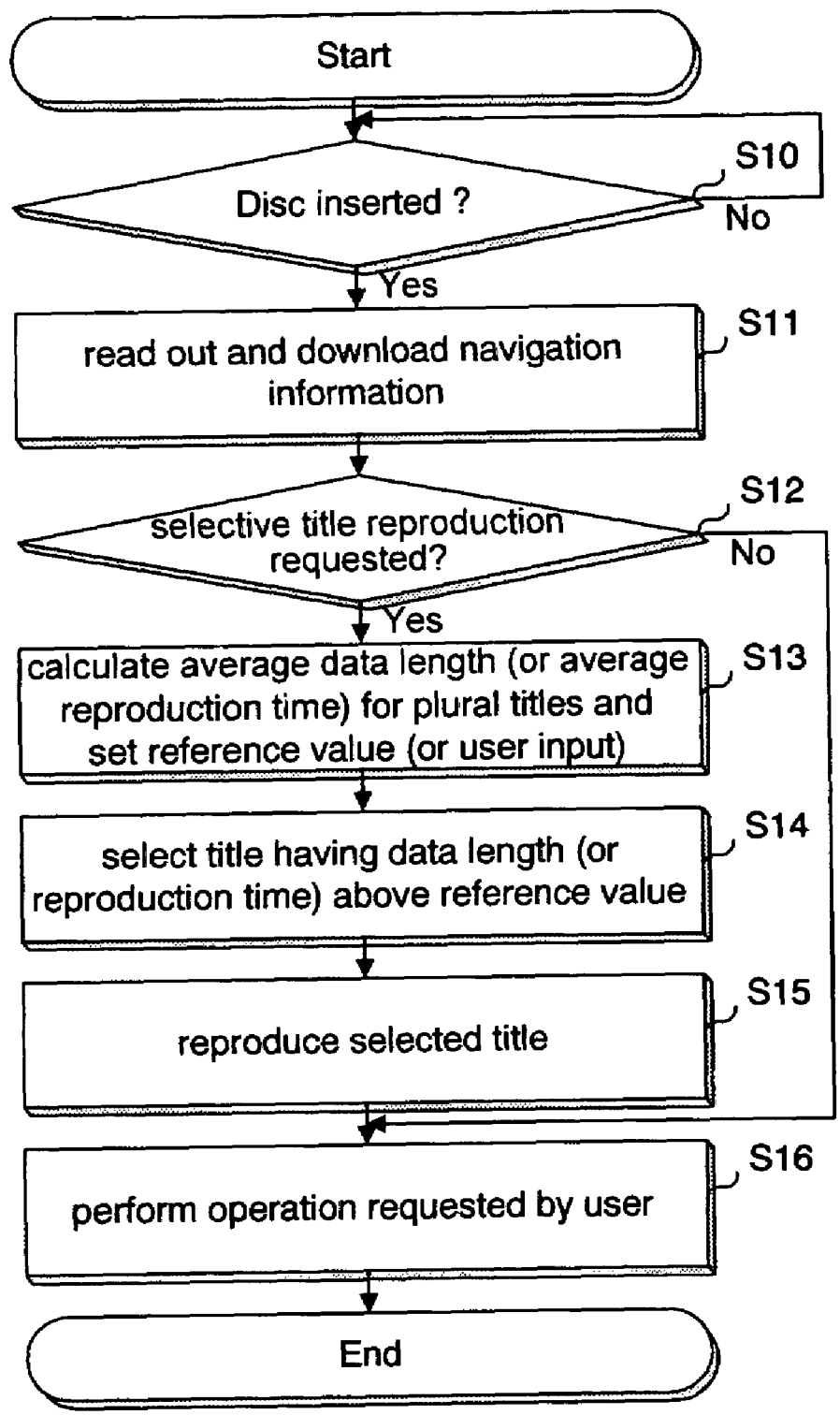
FIG. 3 is a flowchart illustrating an operational procedure of selectively reproducing titles according to an embodiment of the present invention.

FIG. 3 is a flowchart illustrating an operational procedure of selectively reproducing titles according to the present invention. This procedure is implemented in the optical disc device 100 of FIG. 1; however, the present invention is not limited thereto and the procedure can be implemented in other device or system.

If an optical disc 10 is inserted into the optical disc device 100 in step S10, the microprocessor 16 reads out navigation information recorded in a specific area such as a lead-in area of the optical disc 10 and downloads the navigation information into the memory 18 or other storage by controlling the operation of the play system 12 in step S11.

If a user requests an operation for selectively reproducing titles in step S12, the microprocessor 16 confirms a data length (or reproduction time) of each title included in information about titles based on the navigation information downloaded into the memory 18, calculates an average data length (or average reproduction time) using all or some of the data lengths (or reproduction times) identified in the navigation information, and then sets the calculated average data length (or average reproduction time) as a reference value for a title selection in step S13.

In the meantime, if the user inputs a data length (or reproduction time) to be used as the reference value for the title selection, the microprocessor 16 may set the input data length (or input reproduction time) as the reference value for the title selection. In this case, it may not be necessary to determine the average data length/reproduction time.

Thereafter, the microprocessor 16 selects any title having a data length (or reproduction time) longer than the set reference value in step S14 by comparing the data length (or reproduction time) of the set reference value with the data length (or reproduction time) of each title stored in the navigation information.

Then, the microprocessor 16 sequentially reproduces the selected title(s) (e.g., Audio #1, #2, #3, #4 corresponding to Title #3, #5, #7, #9 as shown in FIG. 2) by controlling the operation of the play system 12 in step S15 and then performs operations requested by the user in step S16.

As described above, according to the present invention, it is possible for a user to conveniently select titles satisfying a condition from an optical disc having a plurality of titles recorded therein and reproduce the selected titles. And this process of selecting certain titles is automatically performed by the optical disc device based on certain criteria (e.g., average data length, user-inputted data length, average reproduction time, etc.).

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for reproducing data on a recording medium, the method comprising:

determining, by a data reproducing apparatus, if at least one title satisfies a criterion, by comparing a length of the at least one title with an average length information of a plurality of titles recorded on the recording medium; and reproducing the at least one title if the determining step determines that the at least one title satisfies the criterion.

2. The method as claimed in claim 1, wherein the determining step includes: calculating an average of lengths of the plurality of titles to obtain the average length information.

3. The method as claimed in claim 2, wherein the lengths of the plurality of titles are reproduction times of the plurality titles.

4. The method as claimed in claim 2, wherein the lengths of the plurality of titles are data lengths of the plurality of titles.

5. The method as claimed in claim 2, wherein the lengths of the plurality of titles are obtained from navigation information stored on the recording medium.

6. The method as claimed in claim 5, wherein the navigation information is stored in a lead-in area of the recording medium.

7. The method as claimed in claim 2, wherein the determining step further includes:
    setting the calculated average of lengths of the plurality of titles as a reference value;
    comparing each of the plurality of titles to the reference value; and
    determining that any title that has a length greater than the reference value satisfies the criterion.

8. The method as claimed in claim 1, wherein the at least one title involves multiple titles, and the reproducing step reproduces the multiple titles in a recorded sequence or in a sequence specified by a user.

9. The method as claimed in claim 1, wherein the recording medium is a karaoke disc.

10. The method as claimed in claim 1, wherein the recording medium is a CD or a DVD.

11. The method as claimed in claim 1, wherein the at least one title reproduced in the reproducing step includes audio and/or video data.

12. A method for reproducing data on a recording medium, the method comprising:
    determining, by a data reproducing apparatus, if at least one title recorded on the recording medium satisfies a criterion, by comparing a reproduction time or a data length of the at least one title with a reference value selected by a user; and
    reproducing the at least one title if the determining step determines that the at least one title satisfies the criterion,
    wherein the determining step includes:
    comparing a reproduction time or a data length of each of a plurality of titles recorded on the recording medium to the reference value; and
    determining that any title that has a reproduction time or a data length greater than the reference value satisfies the criterion.

13. The method as claimed in claim 12, wherein the reproduction time or the data length of each of the plurality of titles is obtained from navigation information stored on the recording medium.

14. The method as claimed in claim 13, wherein the navigation information is stored in a lead-in area of the recording medium.

15. The method as claimed in claim 12, wherein the at least one title involves multiple titles, and the reproducing step reproduces the multiple titles in a recorded sequence or in a sequence specified by the user.

16. The method as claimed in claim 12, wherein the recording medium is a karaoke disc.

17. The method as claimed in claim 12, wherein the recording medium is a CD or a DVD.

18. The method as claimed in claim 12, wherein the at least one title reproduced in the reproducing step includes audio and/or video data.

19. An apparatus for reproducing data, the apparatus comprising:
    a controller to determine if at least one title satisfies a criterion, by comparing a length of at least one title with an average length information of a plurality of titles recorded on a recording medium; and
    a reproducing unit to reproduce the at least one title if the controller determines that the at least one title satisfies the criterion.

20. The apparatus as claimed in claim 19, wherein the controller calculates an average of lengths of the plurality of titles to obtain the average length information.

21. The apparatus as claimed in claim 20, wherein the lengths of the plurality of titles are reproduction times of the plurality titles.

22. The apparatus as claimed in claim 20, wherein the lengths of the plurality of titles are data lengths of the plurality of titles.

23. The apparatus as claimed in claim 20, wherein the lengths of the plurality of titles are obtained from navigation information stored on the recording medium.

24. The apparatus as claimed in claim 23, wherein the navigation information is stored in a lead-in area of the recording medium.

25. The apparatus as claimed in claim 20, wherein the controller sets the calculated average of lengths of the plurality of titles as a reference value, compares each of the plurality of titles to the reference value, and determines that any title that has a length greater than the reference value satisfies the criterion.

26. The apparatus as claimed in claim 19, wherein the at least one title involves multiple titles, and the reproducing unit reproduces the multiple titles in a recorded sequence or in a sequence specified by a user.

27. The apparatus as claimed in claim 19, wherein the recording medium is a karaoke disc.

28. The apparatus as claimed in claim 19, wherein the recording medium is a CD or a DVD.

29. The apparatus as claimed in claim 19, wherein the at least one title reproduced includes audio and/or video data.

30. An apparatus for reproducing data, the apparatus comprising:
    a controller to determine if at least one title recorded on a recording medium satisfies a criterion, by comparing a reproduction time or a data length of the at least one title with a reference value selected by a user; and
    a reproducing unit to reproduce the at least one title if the controller determines that the at least one title satisfies the criterion,
    wherein the controller compares a reproduction time or a data length of each of a plurality of titles recorded on the recording medium to the reference value, and determines that any title that has a reproduction time or a data length greater than the reference value satisfies the criterion.

31. The apparatus as claimed in claim 30, wherein the reproduction time or the data length of each of the plurality of titles is obtained from navigation information stored on the recording medium.

32. The apparatus as claimed in claim 31, wherein the navigation information is stored in a lead-in area of the recording medium.

33. The apparatus as claimed in claim 30, wherein the at least one title involves multiple titles, and the reproducing unit reproduces the multiple titles in a recorded sequence or in a sequence specified by the user.

34. The apparatus as claimed in claim 30, wherein the recording medium is a karaoke disc.

35. The apparatus as claimed in claim 30, wherein the recording medium is a CD or a DVD.

36. The apparatus as claimed in claim 30, wherein the at least one title reproduced in the reproducing step includes audio and/or video data.

* * * * *